United States Patent [19]
Bryant

[11] Patent Number: 5,819,465
[45] Date of Patent: Oct. 13, 1998

[54] HOOK SETTING FISHING BUOY

[76] Inventor: Johnnie Bryant, 3606 Rocky La., Little Rock, Ark. 72210

[21] Appl. No.: 680,997

[22] Filed: Jul. 16, 1996

[51] Int. Cl.⁶ .................................................... H01K 97/12
[52] U.S. Cl. ................................ 43/16; 43/17.5; 43/43.11
[58] Field of Search ................................... 43/15, 16, 17, 43/17.5, 43.11

[56] References Cited

U.S. PATENT DOCUMENTS

| | | | |
|---|---|---|---|
| 2,303,668 | 12/1942 | Tilbury | 43/15 |
| 2,504,822 | 10/1950 | Fritscher | 43/15 |
| 2,567,340 | 9/1951 | Lytle | 43/15 |
| 2,615,273 | 10/1952 | Meller | 43/15 |
| 2,631,399 | 10/1953 | Sowa | 43/15 |
| 2,694,875 | 11/1954 | Hoffmann | 43/15 |
| 2,747,317 | 5/1956 | Blaskow | 43/15 |
| 2,995,852 | 8/1961 | Szillage | 43/15 |
| 3,010,238 | 4/1961 | Crumrine, Jr. et al. | 43/16 |
| 3,220,138 | 11/1965 | Greenfield | 43/15 |
| 3,314,185 | 4/1967 | McCoy et al. | 43/15 |
| 3,621,599 | 11/1971 | Uhlich et al. | 43/15 |
| 3,660,922 | 5/1972 | Chill | 43/15 |
| 3,823,501 | 7/1974 | Bybee | 43/15 |
| 3,878,634 | 4/1975 | Quimpo | 43/15 |
| 4,309,838 | 1/1982 | Hodshire | 43/15 |
| 4,953,317 | 9/1990 | Ruchel | 43/17 |
| 5,168,651 | 12/1992 | Wilson | 43/17 |

*Primary Examiner*—Joseph J. Hail, III
*Attorney, Agent, or Firm*—Mark Rogers; Gary N. Speed; Mark M. Henry

[57] ABSTRACT

A hook setting fishing buoy is disclosed having a container with an inner compartment, a spring secured within the compartment and movable between a tensioned position and an untensioned position, a line operatively connected to the spring so that the spring may provide a hook setting force to the line when the spring moves from the tensioned position to the untensioned position and a catch connected to the buoy to releasably retain the spring in a tensioned position until a force is applied to the line. A signal, such as a light, may be operatively connected to the spring to indicate when the spring has moved to the untensioned position, and the spring and signal may be secured to a card that is removably disposed within the compartment.

12 Claims, 2 Drawing Sheets

HOOK SETTING FISHING BUOY

BACKGROUND OF THE INVENTION

This invention relates to fishing, and more particularly, to hook setting fishing devices.

Hook setting fishing devices are known in the art and take a number of different forms, typically using a spring to apply a hook setting force to a line when a fish strikes the line, releasing a catch that releasably holds the spring in a tensioned position. The most common hook setting device is probably the yo-yo that uses a coiled spring to apply hook setting force to a line. Some hook setting devices provide only short pulls or jerks on a line whereas others, like yo-yos, reel the line until the fish is brought to the surface.

Hook setting fishing devices are useful in that they permit a single user to set and use a large number of lines without having to closely monitor each line and without having to react to each potential bite on each line. The devices also offer advantages over trotlines such as by providing greater flexibility in positioning a number of lines and by decreasing the likelihood that a fish will be able to remove bait from a hook without becoming hooked. Hook setting fishing devices are not, however, without problems. For example, the devices typically must be secured or anchored to objects floating on or extending at or near the surface of the water, so deploying or retrieving a number of these devices can be difficult and time consuming. Tangling of lines can also be a problem, particularly when storing a number of the devices together. Also, when set above the surface of the water, devices such as yo-yos will often lift a caught fish at least partially out of the water, killing the fish if it is not removed from the hook relatively promptly. When monitoring such devices that do not bring the fish to the surface, it is often difficult to determine whether a fish has been hooked, whether the spring is still maintained in a tensioned position or whether the spring has been released to an untensioned position and is in need of being reset. When fishing in low light conditions such as at night, early morning or late evening, the tasks of monitoring or retrieving the devices can also be difficult.

SUMMARY OF THE INVENTION

It is therefore an object of the present invention to provide a hook setting fishing buoy that is easy to set, deploy, retrieve and store.

It is a further object of the present invention to provide a device of the above type that may be deployed or floated directly in the water without the need to secure or anchor it to another object.

It is a still further object of the present invention to provide a device of the above type of simple, durable construction It is a still further object of the present invention to provide a device of the above type that provides a signal when the spring has moved to the untensioned position to indicate that a fish has been caught or that the line needs to be reset.

It is a still further object of the present invention to provide a device of the above type that provides for compact, tangle resistant storage when the device is not in use.

It is a still further object of the present invention to provide a device of the above type that uses a light to indicate that the spring has been released to the untensioned position.

It is a still further object of the present invention to provide a device of the above type in which components are secured to a removable card for ease of maintenance and adjustment.

It is a still further object of the present invention to provide a device of the above type of a compact, self-contained design.

It is a still further object of the present invention to provide a device of the above type that provides improved hook setting action.

It is a still further object of the present invention to provide a device of the above type that permits a fish to intermittently turn the signal on and off, helping to indicate that a fish was successfully hooked when the spring was released.

Toward the fulfillment of these and other objects and advantages, the hook setting fishing buoy of the present invention comprises a container having an inner compartment, a spring secured within the compartment and movable between a tensioned position and an untensioned position, a line operatively connected to the spring so that the spring may provide a hook setting force to the line when the spring moves from the tensioned position to the untensioned position and a catch connected to the buoy to releasably retain the spring in a tensioned position until a force is applied to the line. A signal, such as a light, may be operatively connected to the spring to indicate when the spring has moved to the untensioned position, and the spring and signal may be secured to a card that is removably disposed within the compartment.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings, wherein.

DETAILED DESCRIPTION OF THE PREFERRED EMBODIMENT

Figure 1:
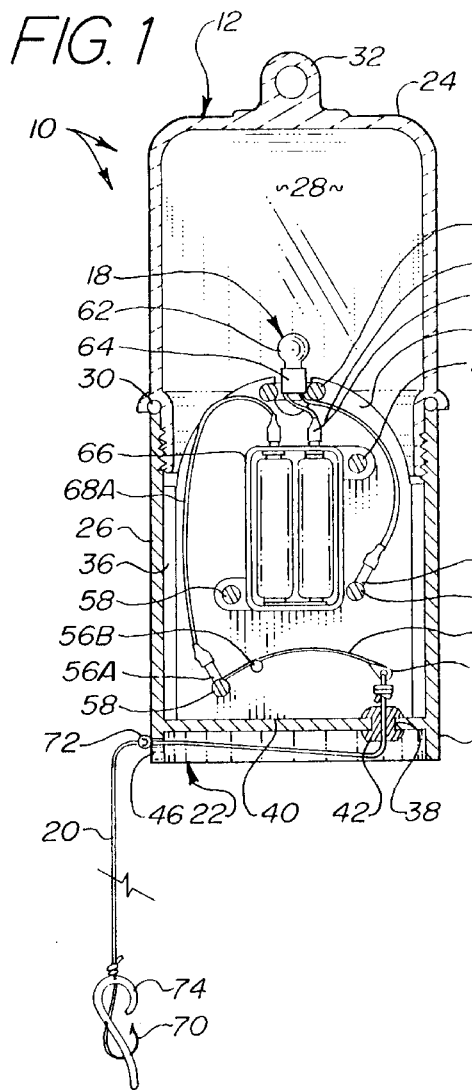
FIG. 1 is a sectional view of a device of the present invention, showing the spring in the tensioned position, with portions omitted for clarity and brevity.

Referring to FIG. 1, the reference numeral 10 refers in general to a hook setting fishing buoy of the present invention, comprising a container 12, an insert 14, a spring 16, a signal 18, a line 20 and a catch 22.

The container 12 has a lid 24 held in threaded engagement with a base 26 to form an inner compartment 28, with a gasket 30 providing a water resistant seal between the lid 24 and base 26. The threads of the lid 24 are disposed on an outer face of the lid at a lower portion thereof. An eye 32 is disposed on the lid 24 for reasons to be described. The lid 24 may be cup shaped as shown or may have a lower wall extending across a lower cross section to form an airtight upper compartment. Similarly, the void space in the lid 24 may be filled with a buoyant material such as styrofoam or a foam rubber type material. A reflective material 34, such as a reflective tape or paint, is preferably affixed to or forms part of the lid 24 for ease in locating the bouy 10 in low light conditions.

The base 26 has threads formed on a inner face at an upper portion thereof. Tapered threads may be used to provide for a water resistant seal. Pairs of flanges 36 extend into compartment 28 to form shallow, substantially vertical grooves 37 on opposite sides of the base 26 for receiving and providing support for the insert 14. Of course, flanges 36 need not be used, and the groove 37 may instead be cut or formed in the walls of the base 26. It is presently preferred to have the groove 37 formed into the walls of the base 26. A hole 38 passes through the floor 40 of the base 26 near an outer edge of the floor 40, sized to permit a line 20, such as a fishing line to pass therethrough. A rubber grommet 42 is disposed in the hole 38 to permit the line 20 to pass and move therethrough while the grommet provides a water resistant seal for the hole 38. As described below, the catch 22 takes the form of a lip 44 which extends downwardly from the bottom of the floor 40 about the circumference or outer edge of the floor, and which has a notch 46 formed in the lip 44. The notch 46 may take any number of shapes and sizes, and for example, may be a narrow slit, an upside-down V, a semicircle or may have a hemispherical or any number of shapes. The notch 46 in the lip 44 is positioned as far from the hole 38 as possible, preferably along an opposite side of a diameter passing through the hole 38. Any number of different catches may be used, including but not limited to catches used in other hook setting devices to releasably hold a spring 16 in a tensioned position. An aperture 47 may be provided in the lip 44 to provide an optional location for attaching an anchor line if desired.

The container 12 is generally cylindrical having a height of approximately 9 inches and a diameter of approximately 4 inches, the lid 24 and base 26 each having a height of approximately 4.5 inches.

The insert 14 is a card that is removably disposed within the compartment 28. The card 14 is sized to fit and slide within the grooves 37 and, when positioned within the compartment 28, extends through most of the height of the base 26 divide the base portion of the compartment 28 into front and rear regions or subcompartments 48 and 50, respectively. The spring 16 and signal 18 are secured to the front face 52 of the card 14 so that they are disposed within the front region, and the rear face 54 of the card 14 is kept substantially free from components or projections so that the rear region is substantially clear from obstructions. Posts 56A, 56B and 56C and holes are provided in the front face 52 of the card 14 as desired for attachment of the spring 16 and signal 18.

The spring 16 is a cantilever type spring commonly called a flat spring or leaf spring.

Figure 2:
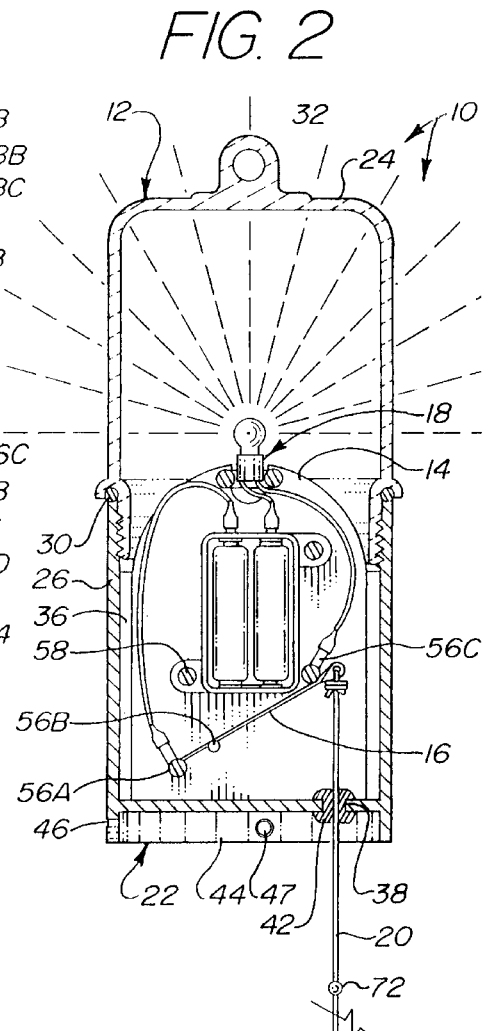
FIG. 2 is a sectional view of a device of the present invention, showing the spring in the untensioned position, with portions omitted for clarity and brevity.
Figure 3:
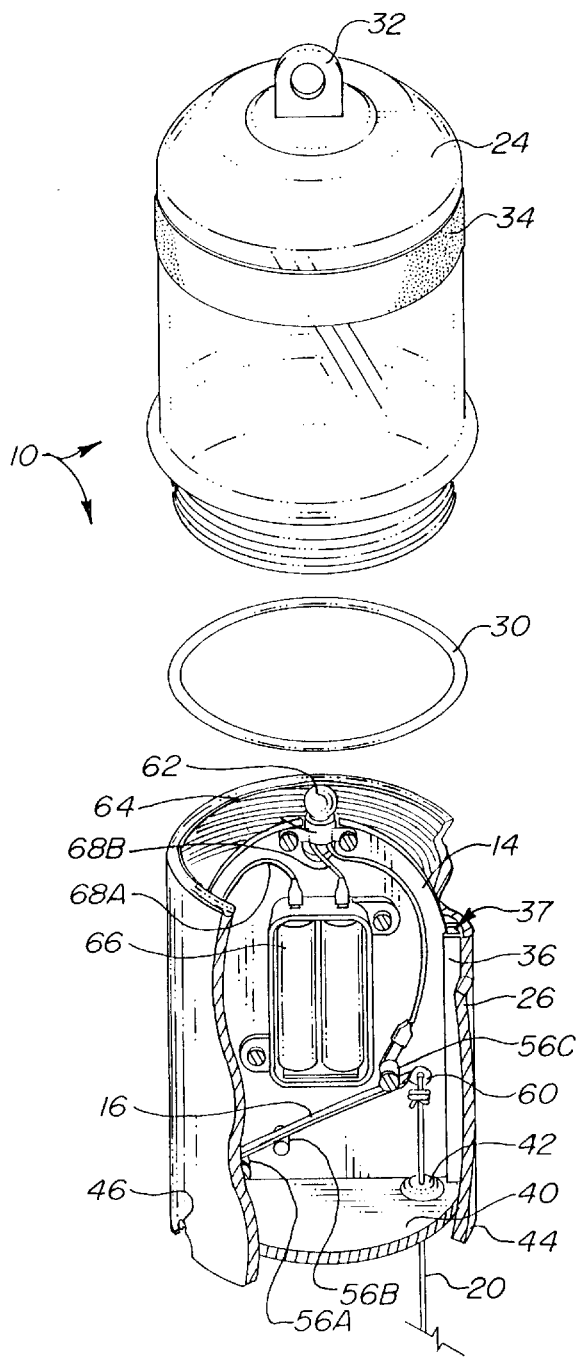
FIG. 3 is a partially exploded view of a device of the present invention, with portions omitted for clarity and brevity.

The spring 16 is an elongate, resilient metal member. A proximal end of the spring 16 is secured to the card 14 near a lower corner of the card, such as by using post 56A and screw 58. The spring 16 is disposed along the front face 52 of the card 14 so that a length of the spring extends substantially parallel to a plane formed by the front face 52 of the card. In an untensioned position, as shown in FIG. 2, the spring 16 extends upwardly across the front face 52 of the card 14 from the proximal end of the spring to the distal end of the spring. A medial portion of the spring 16 passes over or is secured to post 56B, and the distal end of the spring is free to move upwardly and downwardly along the face 52 of the card 14. Post 56B is disposed near and slightly above post 56A, to support and align the spring 16 at the desired angle. A hole 60 or similar means are provided near the distal end of the spring for securing a line 20 to the spring. The length of the spring 16 and angle of the spring along the face 52 of the card 14, in the untensioned position, are selected to provide for the maximum range of motion for the distal end of the spring as the spring moves between the tensioned and untensioned positions.

The signal 18 is a light that comprises a bulb 62, a socket 64, power source 66, such as batteries, and conductors 68A, 68B and 68C. The socket 64 and power source 66 are secured to the front face 52 of the card 14, such as by using screws 58, the power source 66 being positioned as low as possible without interfering with action of the spring 16 for lowering the center of gravity of the container 12, thereby assisting in floating the container in an upright position. Conductor 68A extends from the power source 66 to post 56A where the conductor 68A is in electrical contact with the spring 16. Conductor 68B extends between the power source 66 and the socket 64 for placing the power source 66 in electrical contact with the socket 64 and bulb 62. Conductor 68C extends between the socket 64 and post 56C, where the conductor 68C is in electrical contact with the spring 16 when the spring is in the untensioned position. Of course, any number of different types of signals may be used in place of or in addition to a signal 18, including but not limited to signals using sound or motion or moving or raising flags, banners or other objects.

The line 20 is secured at its upper end to spring 16, near the distal end of the spring, such as by tying it to the spring or by passing the line 20 through a hole 60 in the spring and placing a knot in the line of sufficient size to prohibit the knot from passing back through the hole 60. The line 20 passes from the compartment 28 through hole 38 and grommet 42, and a fishhook 70, or possibly a lure, may be placed at or near a lower end of the line 20. It is understood that the line 20 need not be fishing line, but may take any number of forms including, but not limited to, wire, cable, cord, string, twine, chain or rope. It is also understood that the line need not be a single piece and need not be made of the same material over its entire length. For example, an upper portion of the line 20 extending from the upper end to or past the bead 72 may be one piece made of fishing line or wire, and the remaining length of the line 20 may be a separate line made of fishing line. In that regard, a swivel or similar connector, not shown, may be positioned at or below the bead 72 to allow for easy adding or removal of lines of different length for fishing at different depths or for removing lower portions of the line 20 before storing upper portion of the line 20 in the compartment 28. Also, a weight may be placed at the bottom end of the line, and a number of hooks may tied to the line at different depths if desired.

The bead 72 is disposed on the line 20 a relatively short distance from the top and is positioned on the line for use in connection with releasably retaining the spring 16 in the tensioned position. As used herein, the term bead 72 means an object or area tied to, crimped or formed on or forming part of the line 20 and having an enlarged effective cross sectional area and includes, but is not limited to, such things as a knot tied in the line 20, a sinker, split shot, swivel or similar enlarged area formed by such materials as plastic, rubber, lead or other metal epoxy, fiberglass or any number of materials. The bead 72 is positioned on the line 20 so that when sufficient line is pulled from the compartment 28 to place the spring 16 in a lowermost tensioned position and the line 20 is positioned within the notch 46 of the lip 44, the bead 72 is near or adjacent an outer face of the lip 44 at the notch 46, so that when released, the spring 16 may bias the bead 72 against the outer face of the lip 44 at the notch 46. To avoid interfering with the action of the spring 16, the bead 72 is also positioned far enough down the line 20 so that the bead 72 will not be pulled into contact with the grommet 42 or hole 38 as the spring moves from the tensioned position to the untensioned position. In this manner, the spring is releasably maintained in the tensioned position.

Figure 4:
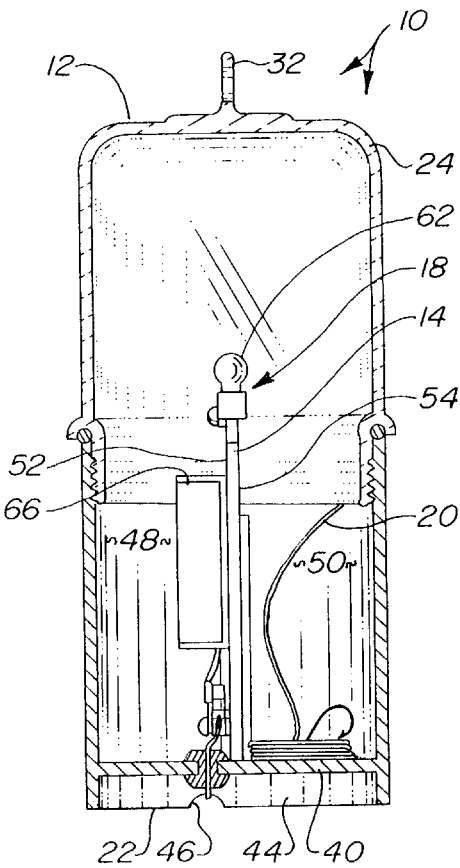
FIG. 4 is a sectional view of a device of the present invention, showing the line in a tangle-resistant storage position, with portions omitted for clarity and brevity.

As shown in FIG. 4, when the buoy 10 is not in use, the lower portion of the line 20, along with the hook 70 and any weights on the line may be placed in the compartment 28, preferably in the subcompartment 50 formed between the rear face 54 of the card 14 and inner walls of the compartment 28, for convenient, tangle resistant storage.

Figure 5:
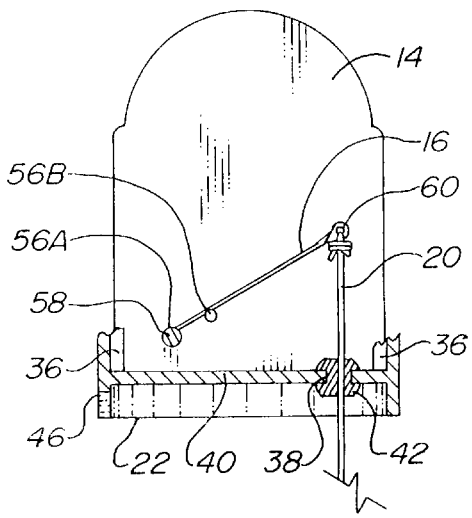
FIG. 5 is a partial, sectional view of an alternate embodiment of an insert for the present invention, with portions omitted for clarity and brevity.

FIG. 5 shows an alternate embodiment that does not use the light. In this simpler version, the spring 16 is affixed to the card 14 and held in place by posts 56A and 56B, and no upper post such as post 56C need be used.

When the buoy 10 of FIGS. 1–4 is in use, with the container 12 closed, a fisherman places bait 74 on the hook 70, pulls the line 20 extending from the compartment 28 down and across to align the line 20 within the notch 46 with the bead 72 positioned adjacent the outer face of the lip 44 at the notch. The fisherman then releases the line 20 so that the tensioned spring 16 biases the bead 72 against the outer face of the lip 44 adjacent to the notch 46 to releasably hold the spring in the tensioned position. In this tensioned position, the spring 16 is out of contact with the post 56C and out of electrical contact with conductor 68C, so the circuit is open and the signal 18 is deactivated or off. The buoy 10 is then placed in the water in an upright position where it is free to float. The low center of gravity of the container 12, together with the downward force supplied by a weighted line 20, should maintain the buoy 10 in the upright position. Additional weighting may of course be place in the compartment 28, preferably in subcompartment 50, to help maintain the buoy 10 in an upright position. If desired, the buoy may also be secured to an object, line 20 or anchor to limit its range of motion. A number of additional buoys may be set and deployed in this manner.

When a fish 76 strikes at the bait 74 and hook 70, the force applied by the fish pulls the bead 72 downward until it clears the notch 46 or until it comes to a portion of the notch through which the bead 72 may pass. At this point, the spring 16 is released to move the untensioned position, thereby supplying a hook setting force to the line 20. Because the notch 46 is positioned at a distance from the hole 38 and grommet 42, it is possible for some slack to develop in the line 20 as the bead 72 is pulled clear of the notch 46, which would result in a more pronounced jerk on the line and hook 70, and therefore an improved hook setting action as the spring 16 pulls the slack from the line. Once a fish 76 is hooked, the fish may swim about, pulling the buoy 10 along the surface and may occasionally even pull the buoy below the surface of the water. The buoy 10 is sized and designed to provide sufficient resistance to tire or exhaust a fish so that the buoy will return to the surface relatively shortly after being pulled under.

When the spring 16 is released, it moves upward until its motion is stopped by post 56C. Conductor 68C is connected to post 56C so that when spring 16 reaches the untensioned position in contact with post 56C, the spring 16 is in electrical contact with conductor 68c, thereby closing the circuit including the bulb 62 and batteries 66 and illuminating the bulb 62. As the fish 76 swims and fights, the forces applied to the line 20 will periodically move the spring 16 out of contact with the post 56C and out electrical contact with conductor 68C, opening the circuit and deactivating the signal 18. This will provide a flashing or blinking that may be useful in drawing attention to the buoy 10 and in helping to distinguish between a buoy that has hooked a fish from one that has been sprung or released without hooking a fish. The intermittent lighting of the bulb 62 may also prolong the life of the bulb 62 and batteries 66.

Once a buoy 10 has been sprung or released, it is a simple matter to reset the buoy. As before, there is no need to open the container 12. The user may simply place additional bait 74 on the hook 70 if needed, pull on the line 20 to tension the spring 16, align the line 20 in the notch 46 with the bead 72 adjacent to an outer face of the lip 44 near the notch and release the line 20 so that the spring 16 biases the bead 72 against the outer face of the lip 44 at the notch.

The buoys also provide for convenient, compact, tangle resistant storage of a number of buoys together. In that regard, to place a buoy 10 in a tangle resistant storage configuration, the lid 24 is removed and the hook end of the line 20 is gathered and placed in the compartment 28, preferably subcompartment 50. The lid 24 is then replace and screwed back in place. As shown in FIG. 4, to avoid running down the batteries 66, the line 20 may be used to pull the spring 16 away from post 56C and conductor 68C before the hook end of the line 20 is placed in the compartment 28. The line 20 is held to keep the circuit open, and the bulb 62 off, until the lid 24 may be screwed onto the base 26 over the line to hold the line in place and maintain an open circuit. Of course, other ways may be used to keep the bulb 62 from remaining illuminated while in the storage position. For example, the batteries 66 may be removed or additional catch or clamp means may be used to maintain an open circuit, or a nonconductive material, such as a rubber band may be placed on or around the post 56c or distal end of the spring 16 for maintaining an open circuit.

Once the hook end of the line 20 is sealed within the compartment 28, the eye 32 in the lid 24 of the buoy 10 may be strung onto a rope, cord, string, line, chain or similar item to conveniently hold a large number of buoys in a compact, tangle resistant storage position.

Other modifications, changes and substitutions are intended in the foregoing, and in some instances, some features of the invention will be employed without a corresponding use of other features. For example, although a flat spring is used in the preferred embodiment, any number of different springs or means may be used for applying hook setting force to the line 20, including but not limited to coil springs, yo-yo style devices or even rubber bands or similar elastic materials. Also, although the signal 18 and spring 16 are described as being secured to a removable card 14, the signal and spring may be secured directly to the container 12, and all or a portion of the spring or signal 18 may be positioned outside of the compartment 28. Further, the insert 14 need not be a card, and need not be removable. Further still, the container 12 may take any number of shape or sizes and may be made from any number of materials. Also, any number of configurations may be used for the circuit. Further, the device or buoy 10 need not be buoyant and may instead be used in a manner similar to nonbuoyant devices, such as by securing the devices 10 to other objects at or near the surface of the water. Of course, all measurements are given by way of example and are not intended to limit the scope of the invention. Accordingly, it is appropriate that the appended claims be construed broadly and in a manner consistent with the scope of the invention.

I claim:

1. A fishing device, comprising:
   a container having a floor and an inner compartment sized to permit storage of a line and hook within said compartment when said device is not in use;
   a spring secured within said compartment, said spring being movable between a tensioned position and an untensioned position;
   a line operatively connected to said spring so that said spring may apply a hook setting force to said line when said spring moves from said tensioned position to said untensioned position, said line passing from said compartment through a hole formed in a wall of said container;
   a bead disposed on said line outside of said compartment; and
   a catch operatively connected to said container for releasably retaining said spring in said tensioned position until a force is applied to said line, said catch comprising a lip projecting from said floor, said lip having a notch formed therein sized to permit alignment of said line therein and to permit said bead to be biased against said lip at said notch by said spring.

2. The device of claim 1 wherein said notch is disposed in said lip remotely from said hole of said container.

3. The device of claim 2 wherein said floor is substantially circular, said hole of said container is disposed through said floor and said notch is aligned on an opposite side of a diameter of said floor from said hole of said container.

4. The device of claim 1 wherein said floor is substantially circular and said lip extends downward from said floor over substantially an entire circumference of said floor.

5. A fishing device, comprising:
   a container having an inner compartment sized to permit storage of a line and hook within said compartment when said device is not in use;
   a spring secured within said compartment, said spring being movable between a tensioned position and an untensioned position;
   a line operatively connected to said spring so that said spring may apply a hook setting force to said line when said spring moves from said tensioned position to said untensioned position, said line passing from said compartment through a hole formed in a wall of said container;
   a grommet disposed in said hole of said container to provide a water resistant seal while permitting movement of said line through said hole; and
   a catch operatively connected to said container for releasably retaining said spring in said tensioned position until a force is applied to said line.

6. A fishing device, comprising:
   a container having an inner compartment sized to permit storage of a line and hook within said compartment when said device is not in use;
   an insert removably disposed within said compartment, said insert being a card;
   a flat spring secured within said compartment and aligned so that a length of said flat spring is substantially parallel with a face of said card, said flat spring being movable between a tensioned position and an untensioned position;
   a line operatively connected to said flat spring so that said flat spring may apply a hook setting force to said line when said flat spring moves from said tensioned position to said untensioned position, said line passing from said compartment through a hole formed in a wall of said container;
   a grommet disposed in said hole of said container to provide a water resistant seal while permitting movement of said line through said hole; and
   a catch operatively connected to said container for releasably retaining said flat spring in said tensioned position until a force is applied to said line.

7. A fishing device, comprising:
   a container lid;
   a container base in threaded engagement with said lid to form an inner compartment, said base having a floor having a hole passing therethrough;
   a gasket disposed between said lid and said base for forming a water resistant seal;
   a line;
   a flat spring disposed within said compartment to apply a hook setting force to said line when a fish strikes a hook on said line, an upper portion of said line passing through said hole in said base and being operatively connected to said flat spring.

8. The device of claim 7 further comprising an insert removably disposed within said compartment, said flat spring being affixed to said insert.

9. The device of claim 8 wherein:
   said insert is a card; and
   said flat spring is aligned so that a length of said flat spring is substantially parallel with a face of said card.

10. A fishing device, comprising:
    a container having an inner compartment sized to permit storage of a line and hook within said compartment when said device is not in use;
    a spring secured within said compartment, said spring being movable between a tensioned position and an untensioned position;
    a line operatively connected to said spring so that said spring may apply a hook setting force to said line when said spring moves from said tensioned position to said untensioned position, said line passing from said compartment through a hole formed in a floor of said container near an outer edge of said floor;
    a bead on said line, said bead being disposed on said line outside of said compartment; and
    a catch operatively connected to said container for releasably retaining said spring in said tensioned position until a force is applied to said line, said catch comprising a lip projecting from said floor, said lip having a notch formed therein sized to permit alignment of said line therein and to permit said bead to be biased against said lip at said notch by said spring.

11. A fishing device, comprising:
    a container having an inner compartment sized to permit storage of a line and hook within said compartment when said device is not in use;
    a spring secured within said compartment, said spring being movable between a tensioned position and an untensioned position;
    a line operatively connected to said spring so that said spring may apply a hook setting force to said line when said spring moves from said tensioned position to said untensioned position, said line passing from said compartment through a hole formed in a floor of said container near an outer edge of said floor;

a catch operatively connected to said container for releasably retaining said spring in said tensioned position until a force is applied to said line; and a grommet disposed in said hole of said container to provide a water resistant seal while permitting movement of said line through said hole.

12. A fishing device, comprising:

a container having an inner compartment sized to permit storage of a line and hook within said compartment when said device is not in use;

a spring secured within said compartment, said spring being movable between a tensioned position and an untensioned position;

a line operatively connected to said spring so that said spring may apply a hook setting force to said line when said spring moves from said tensioned position to said untensioned position, said line passing from said compartment through a hole formed in a floor of said container near an outer edge of said floor;

a catch operatively connected to said container for releasably retaining said spring in said tensioned position until a force is applied to said line;

an insert removably disposed within said compartment, said spring being affixed to said insert, said insert being a card, and said spring being a flat spring, said flat spring being aligned so that a length of said flat spring is substantially parallel with a face of said card; and a grommet disposed in said hole of said container to provide a water resistant seal while permitting movement of said line through said hole.

* * * * *